Patented Dec. 18, 1934

1,984,417

UNITED STATES PATENT OFFICE 1,984,417

PRODUCTION OF ARTIFICIAL MASSES

Hermann Mark, Mannheim, and Hans Fikentscher, Ludwigshafen-on-the-Rhine, Germany, assignors to I. G. Farbenindustrie Aktiengesellschaft, Frankfort-on-the-Main, Germany No Drawing. Application July 19, 1930, Serial No. 469,270. In Germany July 25, 1929

9 Claims. (Cl. 260—2)

The present invention relates to the production of artificial masses.

The initial materials for the preparation of polymerization products of unsaturated carboxylic acids, such as acrylic acid or methyl-acrylic acid, have hitherto been the corresponding monomeric acids. Similarly the derivatives of the polymerized acids have hitherto been prepared from corresponding monomeric derivatives. These monomeric compounds are for the great part difficult to obtain, and in part they cannot be polymerized to the extent necessary in order that the polymerized products may be employed for certain industrial purposes. Moreover, the derivatives of the polymerized acids cannot all be prepared from the monomeric derivatives, at least not directly, as for example the cyclic derivatives hereinafter described. The number of derivatives of the polymerized acids hitherto prepared is therefore very small and these products have hitherto remained without industrial importance, though the polymerized acids and their derivatives may constitute artificial masses having valuable industrial properties.

For the sake of brevity the polymerized acids will be hereinafter referred to as polymeric acids in contrast to the monomeric acids.

We have now found that polymeric acids of the aforesaid nature and their derivatives may be obtained with ease by subjecting the halides or nitriles of the monomeric acids, or mixtures of both, to polymerization which may be effected by any known or suitable method as for example with the aid of light, heat or catalysts, such as peroxides, the polymeric acid halides and nitriles obtained, which are extremely reactive, being then treated, if desired in the presence of an inert diluent with agents containing a reactive hydrogen atom, the halogen or cyanogen is replaced by other radicles.

The polymerization of the monomeric halides or nitriles can be carried out with the halides by subjecting them to the influence of natural or artificial light, if desired, in the presence of high molecular amines such as triethylene tetramine, dipiperidyl and the like or, with the nitriles, by emulsifying the said substances as such or in admixture with each other or with other substances, and then polymerizing them, by heating up to 100° C. if desired in the presence of peroxides such as hydrogen or benzoyl peroxides.

The inert diluents coming into consideration are for example esters of aliphatic carboxylic acids or dioxane on working with halides and the nitriles may be dissolved in concentrated sulphuric acid or phosphoric acids.

Agents having a reactive hydrogen atom are for example water, inorganic bases, mono- or poly-hydric alcohols, hydrogen sulphide, mercaptans, ammonia, primary or secondary amines of aliphatic or aromatic nature, amides and organic compounds capable of reacting in the enolic form such as malonic or aceto-acetic esters. Depending on the activity of these agents the reaction temperature may be varied, the reaction being accelerated in any case by warming to temperatures between 35° and 150° C., temperatures between 70° and 120° C. being usually satisfactory. The reaction may be carried out at a pressure above atmospheric pressure, for example in an autoclave at a temperature above the boiling point of a reaction component or of a diluent.

By treating the polymeric halides or nitriles, or mixtures of both, with water, steam, moist air or organic solvents containing water the polymeric acids themselves are obtained which yield very viscous solutions in water or methanol in contrast to the known polymeric acids which are insoluble in water; when less than the equivalent quantity of water is employed when acting on the polymeric halides, the water-insoluble polymeric acid anhydrides are obtained which only add water in alkaline solution and then pass into solution as the salts of the polymeric acids. Similarly the nitriles yield polymeric acids and when acting thereon with less than the equivalent quantity of water polymeric amides are formed.

The primary, secondary and tertiary aliphatic open chain, cycloaliphatic and aromatic, saturated and unsaturated mono- or poly-hydric alcohols, such as methyl, ethyl, butyl alcohols, cyclohexanol, benzyl alcohol, glycols, glycerol, glycolchlorhydrins, allyl alcohol and the like, by their action on the polymeric acid halides or nitriles, yield the corresponding esters, the reaction proceeding slowly when keeping cold the reaction mixture but very rapidly on warming for example to temperatures up to 100° C.

When the said polymeric acid halides are treated with ammonia a very vigorous reaction with the separation of ammonium chloride takes place, with the formation of acid amides, which are insoluble in water and frequently also of diketo-piperidine compounds which are insoluble in water and some of which are soluble in acetone.

The primary and secondary aliphatic, cycloaliphatic and aromatic, saturated and unsaturated primary or secondary mono- or polyamines such as methyl or butyl amines, ethylene diamine, aniline and cyclohexyl amine and the amides such as formamide or acetamide, react with the formation of the corresponding acid amides; the primary amines may also react similarly to ammonia with the formation of diketo-piperidine compounds.

With hydrogen sulphide or its derivatives such as mercaptans, the corresponding thio derivatives are obtained which are insoluble in water.

Organic compounds containing reactive methylene or methine radicles, such as ethyl malonate, aceto-acetic ester and the like, react with the splitting off of hydrochloric acid and the formation of ketones which are insoluble in water. With hydrocarbons in the presence of aluminium chloride polymeric ketones are obtained according to the Friedel-Craft synthesis. Inorganic alkaline reacting oxides and hydroxides such as sodium or calcium hydroxides, when brought into reaction with the polymeric acid chlorides or nitriles in the presence of water, yield salts of the polymeric acids.

The conversions may be carried out by direct treatment of the polymeric acid chlorides or nitriles with the compounds as hereinbefore specified, which latter may be employed in equimolecular proportions with reference to the polymeric acid chlorides or nitriles and/or in the presence of the diluents hereinbefore specified. A conversion may be effected in the absence of diluents for example merely by energetic mixing in kneading or mixing machines or on rollers at room temperature, or while heating up to 100° C.

For the preparation of the polymeric acid chlorides or nitriles the pure monomeric acid chlorides or nitriles and also mixtures thereof with one another or with polymerizable vinyl compounds, such as vinyl acetate, or with acrylic ethyl ester, styrene and the like may be employed which vinyl compounds, after polymerization, are not only dispersed in the polymeric chlorides or nitriles but apparently are chemically combined therewith. In cases when employing such mixtures mixed polymerization products of acid chlorides or nitriles are obtained which may be converted with substances of the kind referred to above in a manner similar to the polymerization products hereinbefore mentioned.

Furthermore instead of one agent desired to react with the polymeric chlorides or nitriles, several different agents may be brought to reaction simultaneously or consecutively with the polymeric acid chlorides or nitriles, whereby mixed derivatives of the polymeric acids are obtained.

Moreover, suitable non-polymerizable substances, as for example fillers and the like may be added at any stage of the process.

Almost all the resulting conversion products constitute artificial masses having valuable properties which may be employed for a great variety of purposes. They furnish usually highly viscous solutions in suitable organic solvents such as benzene, esters, ketones and the like depending on the nature of the products, and several of them, for example the esters, become plastic when rolled and readily absorb softening agents or fillers.

By the choice of suitable reaction components it is possible to prepare very elastic, vulcanizable and extensible products as well as less elastic and extensible products and soft or even quite hard and inelastic products, the esters, for example being soft and elastic, the softness increasing with the length of the alcoholic chain, and the amides being generally harder than the esters.

The polymeric acids or their salts, esters or amides or mixtures thereof may also find useful application in the preparation of coating compositions or of artificial masses which may contain cellulose esters or ethers. Thus, for example, the polymeric acids or their salts may be employed as thickening or dispersing agents in the preparation of printing pastes and the soluble esters of the polymeric acids may be employed as softening agents in the preparation of threads, films or coating compositions containing cellulose esters or cellulose ethers, the solid products obtained possessing particularly valuable mechanical and chemical properties, such as a high resistance to bending, a high elasticity and a high resistance to cold without being or becoming sticky which disagreeable effect may occur with the softening agents hitherto usual. The films obtainable from the aforesaid mixtures are usually more soft than films from nitrocellulose when considerable quantities of the esters of the polymeric acids have been employed. Thus, for example, very pliable, soft and elastic films resembling leather to some degree can be obtained from mixtures containing about 1 part of nitrocellulose and 4 parts of the aforesaid esters of polymeric acids. On the other hand hard films which, however, possess a very high resistance to breakage by bending can be obtained by reducing the quantity of the esters of the polymeric acids, for example to a proportion of 1 part of nitrocellulose to 1 part of the said esters.

Mixtures of esters and amides of the polymeric acids according to the present invention furnish highly valuable films or threads resembling those prepared from cellulose esters, and the esters, amides and especially the products which have been obtained with the conjoint use of polymerizable vinyl compounds are particularly suitable for the production of solid artificial articles such as are usually obtained by moulding and like mechanical operations.

If desired, the derivatives of the polymeric acids according to the present invention, especially the esters, may be hardened by vulcanization with the aid of sulphur, or agents supplying the same in the manner hitherto employed for the vulcanization of polymeric acids prepared by processes different from that according to the present invention.

The following examples will further illustrate the nature of this invention but the invention is not restricted to these examples. The parts are by weight.

*Example 1*

50 parts of polymeric acrylic acid chloride, obtained by allowing acrylic acid chloride to stand in the light, are dissolved in 800 parts of butyl acetate and 25.4 parts of ethyl alcohol are added. In order to accelerate the reaction, the whole may be indirectly heated for some time to about 90° C. whereby hydrochloric acid is evolved. After distilling off the butyl acetate and removing the hydrochloric acid gas, a plastic mass remains behind, which is readily soluble in butyl acetate and other esters.

Example 2

50 parts of polymeric acrylic acid chloride are dissolved in 800 parts of butyl acetate, 32 parts of allyl alcohol are added and the whole is indirectly heated for some hours to about 95° C. After evaporating off the solvent the allyl ester of polymeric acrylic acid remains behind, which is a clear, elastic mass which furnishes rubber-like products on vulcanization and is soluble in organic solvents.

Example 3

50 parts of polymeric acrylic acid chloride are dissolved in 800 parts of butyl acetate and 51.7 parts of aniline are added. When the whole is allowed to stand in the cold the jelly-like anilide gradually separates out with the evolution of hydrochloric acid which mass becomes hard after distilling off the solvent.

Example 4

50 parts of polymeric acrylic acid chloride are dissolved in 800 parts of butyl acetate and 16.7 parts of formamide are added and the whole is then heated for some hours to about 90° C. The conversion product separates out with a vigorous evolution of bubbles; it is plastic and may be worked up between rollers similarly to rolling India rubber.

Example 5

Polymeric acrylic acid chloride is allowed to stand in moist air in a thin layer. A product of highly polymerized acrylic acid soluble in water or methyl alcohol is formed by saponification and the splitting off of hydrogen chloride, which product furnishes elastic films from a solution thereof in water or methanol and may be employed as a thickening agent for aqueous solutions.

Example 6

50 parts of polymerized acrylic acid chloride are heated together with 1000 parts of water for 5 hours at 120° C. A highly viscous solution is obtained which contains a considerable quantity of hydrochloric acid and from which the highly polymerized acrylic acid separates out in the form of a jelly on cooling. By dissolving the jelly in aqueous ammonia or caustic soda highly viscous aqueous solutions of the salts of the polymerized acrylic acid are obtained which salts may be employed for the production of films or for thickening aqueous solutions.

Example 7

Dry gaseous ammonia is led into a solution of polymeric acrylic acid chloride in dioxane. A white plastic conversion product is precipitated, which contains the amide of the acid and condensation products thereof of diketo-piperidine structure.

Exaple 8

Polymeric acrylic acid chloride is dissolved in butyl alcohol and the excess of butyl alcohol is removed by evaporation. A highly viscous plastic mass of the butyl ester is thus obtained.

Example 9

A solution of 1 part of polymerized acrylic acid chloride in 15 parts of butyl acetate is incorporated with 1.6 parts of isobutyl amine while stirring. The polymerized acrylic isobutyl amide separates out as a jelly and furnishes, after washing with ethyl alcohol and subsequent drying, a crumbly mass which is soluble in organic solvents such as acetone, and can be worked into films as such or together with the polymeric esters of acrylic acid or with other film forming substances for the production of films or of other artificial masses.

Example 10

2 parts of glycerol are added to a solution of one part of polymerized acrylic acid chloride in 15 parts of butyl acetate and the mixture is heated to boiling for a short time whereby, after cooling, the jelly-like polymerized acrylic glycerol ester is obtained. After washing, for example with ethyl alcohol, and drying an insoluble plastic mass is obtained.

Example 11

A solution of 12 parts of highly polymerized acrylic ethyl ester obtainable according to Example 1, and 3 parts of nitrocellulose are dissolved in 85 parts of butyl acetate, whereupon the solution is poured onto a horizontal glass plate. After drying a glass-clear pliable and solid film is obtained which is highly resistant to breakage by bending and from which any folds disappear without any particular precautions in the course of a few hours.

Example 12

50 parts of water-insoluble polymeric acrylic chloride are heated in an autoclave for 5 hours to 120° C. together with 800 parts of water, while stirring. A highly viscous solution, containing hydrochloric acid, of the polymeric acrylic acid is obtained, which latter separates out on cooling in the form of a jelly. The product is soluble in methanol or water or in aqueous solutions of organic solvents or in aqueous solutions of alkalies with the formation of highly viscous solutions and may be employed as a valuable dispersing agent for pigments, as a thickening agent in printing cloth and as a film-forming basis for aqueous coating preparations.

Example 13

5 parts of polymeric acrylic nitrile are heated together with 4 parts of caustic soda and 65 parts of water under a reflux condenser. A highly viscous solution of the sodium salt of the polymeric acrylic acid is obtained which may be employed as a dispersing agent in the preparation of pastes from pigments, as a thickening agent or for impregnating purposes. By evaporation the solid sodium salt is obtained which is soluble in water to give highly viscous solutions.

Example 14

1 part of highly polymerized acrylic nitrile is heated in a stirring autoclave for 5 hours at 130° C. together with 10 parts of concentrated aqueous ammonia. A jelly is obtained which, after distilling off the remainders of ammonia, is soluble in water with the formation of highly viscous solutions and furnishes transparent films on drying thin layers thereof. The yield of the mixture of polymeric acrylic acid and of polymeric acrylic amide is quantitative.

Example 15

80 parts of polymerization product, obtained by the polymerization of a mixture of 60 parts of acrylic nitrile and of 40 parts of styrene emulsified in an aqueous solution of 1 part of di-butyl naphthalene sulphonic acid sodium salt and 1 part of sodium oleate in 200 parts of water, are heated in a stirring autoclave for 5 hours at from 130° to 140° C. together with a solution of 36 parts of caustic soda in 1000 parts of water. A viscous solution is obtained which may be employed as a thickening agent for printing pastes. If desired the sodium salt of the mixed polymerization product may be obtained from the solution by evaporation or by precipitation by means of ethyl alcohol or the mixture of free polymeric carboxylic acid and polymeric styrene may be obtained by precipitation with an acid as for example with an aqueous 5 per cent hydrochloric acid. All the products are soluble in water or in aqueous solutions of alkalies with the formation of highly viscous solutions.

What we claim is:—

1. The process for the production of artificial masses which comprises acting on a polymeric acrylic acid derivative, selected from the group consisting of polymeric acrylic halides and nitriles, with an agent containing a reactive hydrogen atom, selected from the group consisting of water, inorganic bases and primary and secondary amines.

2. The process for the production of artificial masses which comprises warming a polymeric acrylic acid derivative, selected from the group consisting of polymeric acrylic halides and nitriles, with an agent containing a reactive hydrogen atom, selected from the group consisting of water, inorganic bases and primary and secondary amines.

3. The process for the production of artificial masses which comprises warming a polymeric acrylic acid derivative, selected from the group consisting of polymeric acrylic halides and nitriles, with an agent containing a reactive hydrogen atom, selected from the group consisting of water, inorganic bases and primary and secondary amines at a pressure above atmospheric pressure.

4. The process for the production of artificial masses which comprises acting on a polymeric acrylic acid derivative, selected from the group consisting of polymeric acrylic halides and nitriles, with an agent containing a reactive hydrogen atom, selected from the group consisting of water, inorganic bases and primary and secondary amines in the presence of an inert diluent.

5. The process for the production of artificial masses which comprises acting on a polymeric acrylic acid derivative, selected from the group consisting of polymeric acrylic halides and nitriles, with aqueous ammonia.

6. The process for the production of artificial masses which comprises acting on a polymeric acrylic acid derivative, selected from the group consisting of polymeric acrylic halides and nitriles, with an amine selected from the group consisting of primary and secondary amines.

7. The process for the production of artificial masses which comprises acting on a polymer of an aliphatic unsaturated acid derivative, selected from the group consisting of halides and nitriles of acrylic acid and methyl acrylic acid, with an agent containing a reactive hydrogen atom, selected from the group consisting of water, inorganic bases and primary and secondary amines.

8. The process for the production of artificial masses which comprises acting with a carbocyclic amine containing a reactive hydrogen atom on a polymeric acrylic acid derivative, selected from the group consisting of polymeric acrylic halides and nitriles.

9. An amide of polymeric acrylic acid in which the amido group contains a carbocyclic radical and which is substantially identical with a product produced by the process of claim 8.

HERMANN MARK.
HANS FIKENTSCHER.